United States Patent

Ribeyre

[11] 4,232,205
[45] Nov. 4, 1980

[54] MICROPHONE MOUNT
[75] Inventor: René Ribeyre, Paris, France
[73] Assignee: Thomson-Brandt, Paris, France
[21] Appl. No.: 930,255
[22] Filed: Aug. 1, 1978
[30] Foreign Application Priority Data
Aug. 30, 1977 [FR] France ................. 77 26309
[51] Int. Cl.² ............................................. H04R 1/28
[52] U.S. Cl. ............................................. 179/146 R
[58] Field of Search ............... 179/146 R, 180, 1E, 179/179; 181/181, 179
[56] References Cited
U.S. PATENT DOCUMENTS
3,947,646   3/1976   Saito .................. 179/146 R
4,028,504   6/1977   Massa ................. 179/146 R
4,152,544   5/1979   Sanpei et al. ........ 179/146 R Primary Examiner—Thomas A. Robinson
Attorney, Agent, or Firm—Edwin E. Greigg

[57] ABSTRACT

The built-in microphone of portable sound recorders or the like is mounted to the interior of the cabinet wall by means of a fixture which includes an intermediate member that holds the microphone and that is fastened to the cabinet wall. The intermediate member described in an exemplary embodiment is a lead disc which offers a high impedance to the propagation of mechanical vibrations from the tape transport mechanism to the microphone.

4 Claims, 1 Drawing Figure

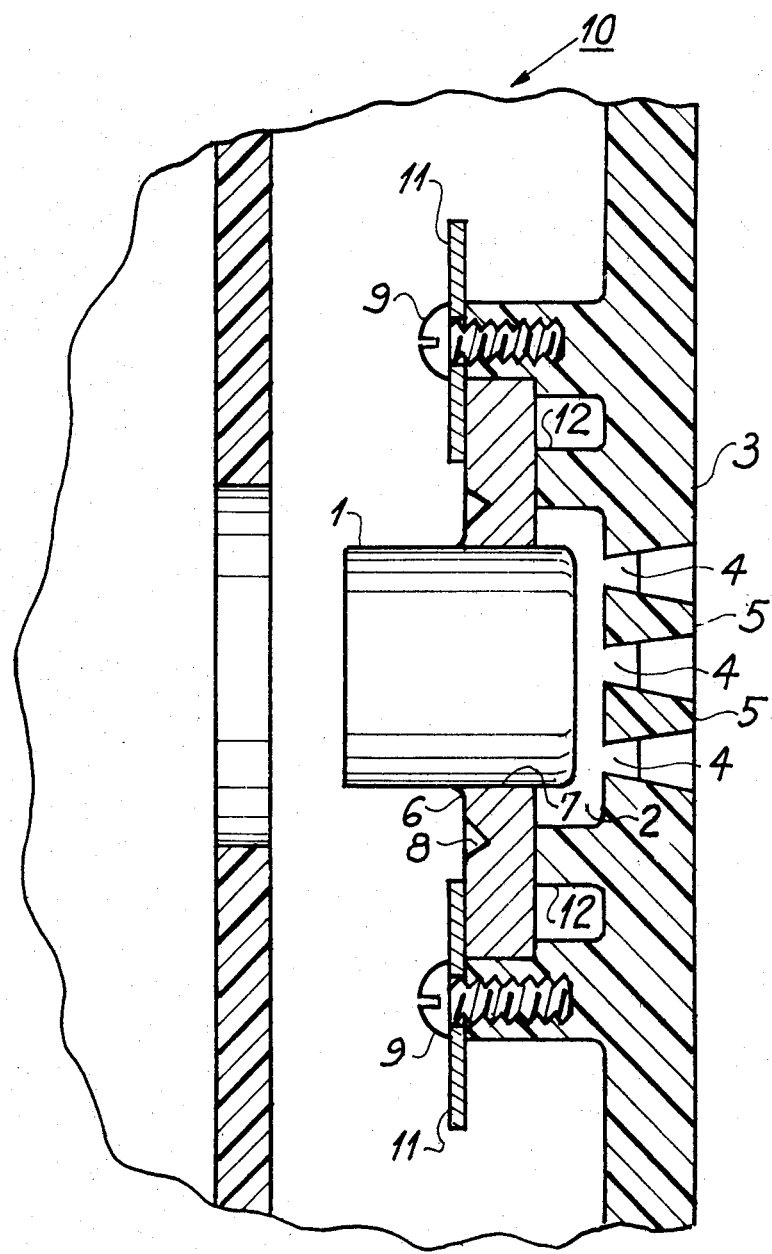

MICROPHONE MOUNT

BACKGROUND OF THE INVENTION

The invention relates to a device for mounting a microphone built into portable or movable audio equipment, for example a tape recorder or a combination radio receiver and cassette recorder commonly called a radio cassette recorder. Recording equipment of this type normally includes transport mechanisms, for example a motor and transmissions which have pulleys and rollers and/or gears so as to transport the material which stores the audio information, in particular a magnetic tape.

In known tape recorders or radio-cassette combinations which include a built-in microphone, the microphone is mounted at the inside of the front or top wall of the enclosure of the mechanism with the aid of a support fixture which normally surrounds the microphone and holds it in place with the aid of fingers that are attached by screws to threaded holes in the enclosure. Such supports or fixtures are described for example in the U.S. Pat. No. 3,947,646 or the French Pat. No. 2,210,071. They are configured to hold or surround the generally cylindrical microphone and are made of metal or plastic in the form of sheet metal plates or thin foils so as to have a very high acoustic impedance. They may also be made of natural or synthetic rubber of varying degrees of rigidity and elasticity so as to attenuate as much as possible any mechanical vibrations which are transmitted to the chassis and to the cabinet supporting it from the drive motor and other components of the tape transport mechanism. If the microphone mount is made from an elastic material, it will constitute, together with the microphone, a resonant mechanical system whose natural resonance frequency must lie below the low cut-off frequency of the microphone, i.e., approximately 10 Hz. Such a condition is almost impossible to fulfill due to the fact that the microphones used in portable recorders usually have very low mass, whether they are electret microphones or other types.

OBJECT AND SUMMARY OF THE INVENTION

It is a principal object of the present invention to provide a microphone mount for portable recording equipment in which the aforementioned disadvantages are prevented, i.e., in which any vibrations are highly attenuated and kept from being transmitted to the microphone. This and other objects are attained by providing an intermediate member between the microphone and the cabinet or chassis in which it is mounted and wherein the intermediate member is made from a relatively inelastic material, i.e., an inert or amorphous material.

In a particular feature of the invention, the intermediate member is a disc, for example made of lead, with a central opening for holding the microphone, the edges of the disc being affixed to the chassis or the cabinet by known means.

The invention will be better understood as well as further objects and advantages thereof become more apparent from the ensuing description of the preferred embodiment taken in conjunction with the drawing.

BRIEF DESCRIPTION OF THE DRAWING

The single FIGURE of the drawing is a sectional view of a part of a sound-recording apparatus including a built-in microphone.

DESCRIPTION OF THE PREFERRED EMBODIMENT

Turning now to the single FIGURE, there will be seen a cylindrical microphone 1 which is intended to be the built-in microphone of a sound recording instrument, not further shown, and held in a cavity 2 by a number of elements, to be further described, against the inside surface of the front wall 3 of the cabinet 10. The wall 3 is perforated in the vicinity of the diaphragm of the microphone so as to permit a communication of the air in the cavity 2 and the external air volume via openings 4 in a protective grill 5.

According to the invention, the mechanism for mounting the microphone in position includes an intermediate member 6 of annular shape and made from a solid inert material of low or very low elasticity. Preferably, the specific gravity of the material of the member 6 is relatively high so as to constitute a relatively high acoustic impedance. One of the less costly materials of this type is lead which has the additional advantage of being easily deformed in the cold state.

In the exemplary but not limiting embodiment illustrated in the single FIGURE, the intermediate member 6 is a round lead disc of a thickness advantageously between 2 and 5 millimeters depending on the weight of the microphone which is being mounted and having an outside diameter approximately twice as large as that of the body 1 of the microphone. The disc 6 has a central hole 7 into which the microphone is inserted. The body of the microphone 1 is fixed within the lead disc 6 by adhesives or, preferably, by swaging with the aid of a tubular tool, the end of which is a circular edge whose inside surface constitutes an angle of approximately 45° with respect to the axis of the microphone 1. This tool is pressed into the disc 6 to form therein v-shaped depressions 8 and thus to firmly close the hole 7 with respect to the microphone 1 and thereby to cause a rigid bond between the disc and the microphone 1. It should be noted that the intermediate member 6 may suitably have other shapes adapted to particular microphones 1 and may also be affixed thereto by any other known and suitable, nondestructive method of joining.

The disc 6 which holds the microphone 1 is now mounted flush with the face of a tubular extension 12 which surrounds and defines the cavity 2 by means of screws 9 and washers 11. Preferably, the wall thickness of the tubular extension 12 is small, so as to reduce the amount of mechanical coupling between the cabinet and the microphone. It is also desirable if the wall of the extension 12 is as far away from the microphone as physically possible within the other constraints of the cabinet so that vibrations originating in the cabinet must pass through a long path of propagation before arriving at the microphone, the attenuation of such vibrations being proportional to the length of the path and inversely proportional to the coupling area.

It is emphasized again that the mounting fixture according to the present invention is applicable to the mounting of microphones in a large variety of recording devices, built for recording and/or reproduction of sound and including a built-in microphone, such as portable recorders, dictaphones, combined radio-cassette recorders and the like. In particular, the invention comprises numerous variants of the embodiment shown as well as other embodiments, all of which are intended to be included within the spirit and scope of the invention.

What is claimed and desired to be secured by letters patent of the United States is:

1. A mounting fixture for mounting a microphone interiorly of a housing enclosure for enclosing a sound recording device, said sound recording device including mechanical transport means for a recording medium, and wherein the improvement comprises:

said mounting fixture including an intermediate member of lead placed between said microphone and said enclosure for providing support for and acoustic decoupling of said microphone from said enclosure; whereby vibrations transmitted from said transport means to said microphone are dampened.

2. A mounting fixture according to claim 1, wherein said lead intermediate member is of disc shape having a central opening to receive said microphone, said mounting fixture further including means for attaching said lead disc to an interior surface of said enclosure.

3. A mounting fixture according to claim 2, wherein said disc has a thickness of at least 2 millimeters.

4. A mounting fixture according to claims 2 or 3, wherein said interior surface of said enclosure is provided with a substantially cylindrical inwardly extending tubular support having an end face upon which said lead disc is mounted thereby introducing said microphone into said tubular support, the walls of said tubular support contributing to the increase of the acoustic impedance of the path between said enclosure and said microphone so as to further attenuate the propagation of mechanical vibrations thereto.

* * * * *